June 30, 1964   W. E. SWARTZ ET AL   3,139,349
METHOD OF CONTROLLING THE TEMPERATURE WHILE SMOKING MEAT
Filed Dec. 5, 1960

INVENTORS
WILLIAM E. SWARTZ
DONALD M. STOUGH
BY William L. Krayer
ATTORNEY

United States Patent Office 3,139,349
Patented June 30, 1964

3,139,349
METHOD OF CONTROLLING THE TEMPERATURE WHILE SMOKING MEAT
William E. Swartz, McKeesport, and Donald M. Stough, Penn Hills Township, Allegheny County, Pa., assignors to Calgon Corporation, a corporation of Pennsylvania
Filed Dec. 5, 1960, Ser. No. 73,754
4 Claims. (Cl. 99—229)

This invention relates particularly to methods and apparatus for the curing of meat in a smokehouse. It has general application wherever a gradual temperature change in a processed object is required.

Prior to the present invention, the methods and apparatus generally used for controlling the temperature of the atmosphere in a smokehouse have had serious defects. The controls are inadequate in that the meat is not heated at a uniform rate and consequently is not uniformly cured and does not have uniform moisture distribution. Whether the heat is introduced to the smokehouse at a steady rate or intermittently, the meat is quite often imperfectly cured because of the erratic conditions of heat transfer at the surface of the meat.

We have discovered that an excellent ham or other piece of cured meat may be produced through the use of our invention. The invention provides a known temperature differential between the interior of the meat and the atmosphere or the outer surface of the meat, resulting in a controlled rate of heat transfer to the meat.

As the meat absorbs heat from the atmosphere and its internal temperature rises, a control system may be utilized according to our invention causing the temperature of the atmosphere to rise to maintain the constant temperature differential. Thus, our invention as applied to meat curing is a method of heating meat in a smokehouse comprising maintaining a desired differential between the internal temperature of the meat and the atmosphere or the surface temperature of the meat. Obviously, the invention is exactly the same as applied to any process where it is desirable to increase or decrease the temperature of an object at a uniform or programmed rate by passing heat to or from a controlled environment. However, for the sake of simplicity our discussion will be limited to the illustration of smokehouse control.

Our method may be performed by manual adjustment of heating equipment, dampers, fans, or the like with visual reference to a pair of temperature indicators. That is, one may continually adjust by hand the devices necessary to increase the temperature of the smokehouse as the internal temperature of the meat increases. Thus, our invention as applied to smokehouse control is a method comprising maintaining the smokehouse temperature at a predetermined quantity over the internal temperature of a selected meat product being processed in the smokehouse. This may be accomplished either manually or automatically.

We have illustrated in the drawings two alternate presently preferred automatic control systems for carrying out our method without the constant attention required for manual control.

Figure 1:
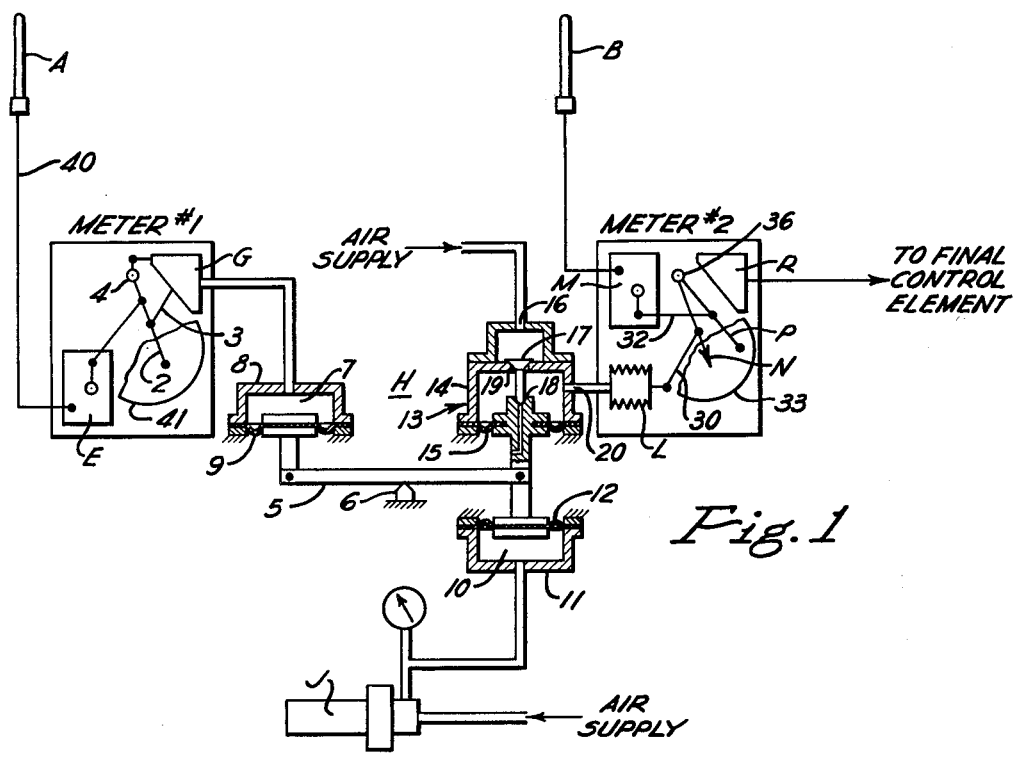
FIGURE 1 is a more or less diagrammatic illustration of our automatic smokehouse control system in its preferred form employing pneumatic components.

In FIG. 1 our preferred apparatus includes, briefly, an internal meat temperature sensing element, means for generating a pneumatic signal proportional to the internal temperature of the meat, and means for receiving the pneumatic signal, biasing it by a signal proportional to the desired temperature differential, and retransmitting it as a control signal to a device which controls the heat input.

Device A is preferably a standard platinum resistance bulb temperature sensing device which modifies an electrical signal as a function of the temperature of its environment, in this case the interior of a ham. Any device capable of generating or modifying a signal as a function of the temperature may be used so long as it is operable in the desired temperature range and resistant to chemical attack by pickling salts, etc. An example of another satisfactory device is a thermocouple. Our preferred resistance bulb is a simple probe sharp enough to be inserted into a meat product such as ham containing a circuit comprising a platinum resistance element which changes electrical resistance according to its temperature. Such devices are well-known in the art fo temperature sensing.

The output of device A is transmitted through electrical connection 40 to device E on meter #1. Device E is an electronic device capable of converting an electrical input signal such as that from a resistance bulb to a mechanical motion as a function of the input. It is used here to drive a meter pen 2, mounted on fixed pivot 4, for recording on chart 41 the internal temperature of a ham as transmitted by device A. The preferred specific device E for use with resistance bulbs is "PowrLog" Model H-O Receiver manufacturer's Specification Sheet OE-10003A. Other similar or related devices for converting the signal at the sensing element to a pen movement could be substituted. Where thermocouples are used, we prefer to use "PowrLog" Model TC Receiver manufactured by Hagan Chemical & Controls, Inc.

Device G is a device which performs the function of generating a pneumatic signal proportional to the position of the pen arm 2 as indicated to it by the relative position of mechanical linkage 3. The specific preferred device is the Hagan Pneumatic Signal Transmitter, fully described in Bulletins MSP-151 and MYP-633 of the manufacturer, Hagan Chemicals & Controls, Inc.

The pneumatic output of device G is fed into chamber 7 of ratio totalizer H where it acts on diaphragm 9, tending to force beam 5 counterclockwise.

Device J is a pneumatic hand sender. We prefer to use the manual sending station of Hagan Chemicals & Controls, Inc., fully described in Bulletin MYP-503A of the manufacturer. The function of device J is to generate a pneumatic signal proportional to the desired temperature differential between the interior of the ham and the smokehouse atmosphere. Any one of many standard pneumatic transmitters may be substituted. This signal is transmitted to chamber 10 of ratio totalizer H, where it exerts a counterclockwise force on beam 5.

Preferably pneumatic ratio totalizer H will be of the type fully described in Bulletin MSP-120 of the manufacturer, Hagan Chemicals & Controls, Inc. It is a pneumatic force balance device having a beam 5 mounted on center fulcrum 6, chamber 7 defined by chamber housing 8 and diaphragm 9, chamber 10 defined by housing 11 and diaphragm 12 and force balancing device 13 defined by chamber housing 14 and diaphragm 15. Force balancing device 13 includes inlet port 16 for a constant air supply, poppet valve 17 and exhaust seat 18. Inlet seat 19 of poppet valve 17 provides means for regulating the amount of air entering device 13. Device 13 also includes output port 20.

The operation of ratio totalizer H is as follows: A counterclockwise movement of beam 5 tends to close exhaust seat 18 and open inlet seat 19, thus increasing the pressure in chamber 13 until the forces are balanced. Thus, the pressure in chamber 13 and the output pressure in port 20 are equal to the algebraic sum of the pressures in chambers 7 and 10. Specifically, the output of device 13 is equal to the internal temperature signal plus the desired differential, or the output is the pneumatic pressure equivalent of the desired atmospheric temperature.

The output of ratio totalizer H is delivered to bellows L on meter #2. Bellows L is expanded a distance proportional to the pressure introduced into it and, through linkage 30, positions an indicator N on the face of meter #2. Indicator N mounted on fixed pivot 36 thus is made to indicate the desired atmospheric temperature in the smokehouse at the moment.

Indicator P (preferably a pen arm), also mounted on fixed pivot 36, is positioned by receiver M through linkage 32 to indicate or record the temperature of the atmosphere of the smokehouse as determined and transmitted by temperature sensing element B which is similar to temperature sensing element A. Receiver M is preferably identical to receiver E on meter #1. Where indicator P is a pen arm, it may record on a circular chart 33.

Signal transmitter R is a device which is actuated by a difference in position of indicator N and indicator P. It transmits a pneumatic control signal the function of which is to correct the controlled variable, the temperature of the smokehouse, and thus to bring indicator P in line with indicator N. This device is fully described in Bulletins MSP-151 and MYP-633 of Hagan Chemicals Controls, Inc. and is used as a proportional controller which may be used with added auxiliary modes of control such as integral or derivative action as described in the bulletins.

Ratio totalizer H may include a fourth diaphragm pressure chamber to exert a clockwise pressure from a position under beam 5 at the same distance from the fulcrum as chamber 7. This chamber may be used to introduce a negative bias in the same manner in which a positive bias is introduced to chamber 10. The negative bias could, of course, transform the control into a cooling, rather than a heating, system.

Depending on the type of heating used, various functions can be performed with the control signal. Usually, where the air entering the smokehouse is to be preheated, the control signal leaving device R can be used to control the heater's full scale. It may also be used to control a damper or the like. The most desirable use is one which will attempt to correct the smokehouse temperature as quickly as possible.

Figure 2:
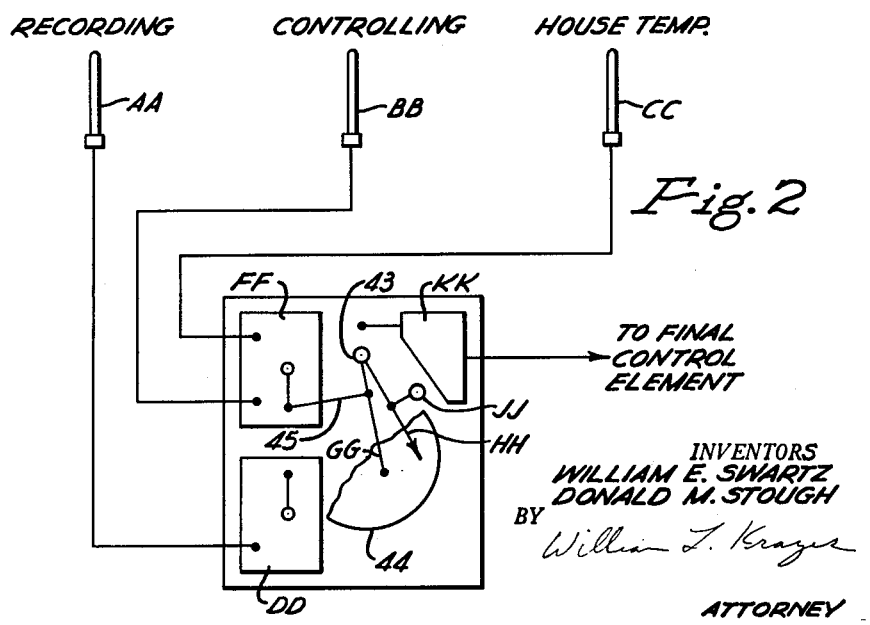
FIG. 2 is a more or less diagrammatic illustration of our automatic smokehouse control system in an alternate preferred form employing electronic components.

As shown in FIG. 2 our alternate preferred apparatus comprises an internal meat temperature sensing element and a smokehouse temperature sensing element, separate means for generating or modifying electrical signals representing their respective temperature readings, means for receiving these two signals and driving a recording pen a distance proportional to the difference between them, and means for comparing the position of the recording pen with the position of a manually adjustable desired temperature difference indicator and generating a control signal representing a variance between the two positions.

In FIG. 2 controlling internal meat temperature probe BB senses the internal temperature of a meat product and transmits an electrical signal representative thereof to receiver FF. Receiver FF also receives a signal representing the atmospheric temperature of the smokehouse from temperature sensing device CC. Temperature sensing elements BB and CC are preferably platinum resistance bulbs but may be thermocouples provided receiver FF is modified to receive their signals. Through linkage 45, pen GG mounted on fixed pivot 43 is driven by device FF to indicate the difference between the two temperatures on a chart 44. Device FF may be constructed according to the disclosure of Luppold and Stough, "Apparatus for Measuring Variables," S.N. 861,588, filed in the United States Patent Office on December 12, 1959, now abandoned. Of course, any device capable of moving the pen a distance proportional to a given change in temperature difference may be employed.

Element HH is an indicator mounted on fixed pivot 43. It is manually adjustable, optionally through a device JJ comprising a simple knob and gear train. This indicator HH is moved by the operator to a position proportional to the desired temperature differential as indicated on chart 44. Device KK is a pneumatic transmitter identical to device R of FIG. 1. In this case it compares the positions of pen GG and indicator HH and generates a control signal representing a variance between them. This control signal, which may be subject to reset and rate action, is used to control the operation of a heating element, damper, or the like to maintain the desired smokehouse temperature.

Device DD and temperature sensing element AA are optional and do not contribute to the automatic control computation. Temperature sensing element AA, similar to the other like elements described herein, transmits an internal meat temperature analog to a recorder DD, which simply records the actual temperature of the meat. If desired, this unit may be equipped with a device for automatically cutting off the heat when a predetermined end temperature is reached.

The effect of our invention is to gradually raise the atmospheric temperature to maintain it at the desired temperature quantity or increment over the internal temperature of the meat, which, of course, rises steadily.

It will be apparent to those familiar to the temperature control art that many variations and substitutions in the equipment may be employed. The system of FIG. 1 is different from that of FIG. 2 not only in the type of analog signals used, but also in the manner of computation. The device of FIG. 1 generates a meat temperature signal, adds a desired temperature difference signal and compares the resultant mechanical indication to a mechanical indication of the actual smokehouse temperature, generating a control signal calling for more heat if there is a variance. The device of FIG. 2 is slightly different in that it first compares the meat temperature to the actual smokehouse temperature, and then compares the actual difference to the desired difference, generating a control signal calling for more heat if there is a variance.

Any apparatus is within the contemplation of our invention which provides, as in FIG. 2, means for generating a smokehouse signal representing the smokehouse temperature, means for generating a product signal representing the internal temperature of a meat product being heated in the smokehouse, adjustable means for generating a bias signal representing a desired differential between the internal meat temperature and the smokehouse temperature, means for generating a control signal representative of a variance between the bias signal and the difference between the smokehouse signal and the product signal, and means responsive to the control signal for controlling the smokehouse temperature. The bias may as well be added to the product signal and the result compared to the smokehouse signal for generation of the desired control signal, as illustrated in FIG. 1. We mean to include any apparatus which generates a control signal which calls for more heat when the internal temperature of a product climbs too close to the temperature of the smokehouse.

We have found that the most efficient and otherwise desirable temperature differential in a smokehouse is in the range of 25-35° F. Thus, if the bias is set at say 30° F., our automatic apparatus as described will call for more heat as the internal temperature of the meat tends to climb within 30° F. of the smokehouse temperature. As heat is introduced and the temperature gap is widened, the control signal will accordingly cut off the heat or reduce its introduction.

It is, of course, to be understood that a measurement of the surface temperature of the meat is equivalent to a measure of the temperature of the atmosphere in the smokehouse.

Our invention may be used to control any process which requires a regulated rate of heat transfer into or from a mass situate in an environment capable of temperature regulation. That is, it may be used not only to control a heating process but also a cooling process. An example of a cooling process in which the rate of heat transfer is critical is one in which the size of crystal formation depends on the rate of cooling a liquid mass.

Some drying processes involving the use of heat bring about gradually decreasing coefficients of heat transferability at the surface of the mass being dried, due to the loss of moisture. In this and other types of heating or cooling control systems, it may be desirable to decrease or otherwise vary the bias signal at a predetermined rate or according to a predetermined program. For example, it may be desirable in a particular process for the object being heated to increase in temperature rapidly at first and, as it approaches the desired end temperature, gradually level off. In such a case, a bias signal may be provided which gradually decreases either directly in relation to time or as a function of the heated object's internal temperature.

As previously mentioned, our method may be manually performed with visual reference to a pair of temperature indicators. Although the presently preferred method of curing meat is to maintain a constant temperature differential, any preconceived program of temperature relation may be followed.

Having thus described and illustrated certain presently preferred embodiments of our invention and methods of practicing same, it is to be distinctly understood that our invention is not limited thereto but may be otherwise variously embodied within the following claims.

We claim:

1. The method of controlling the temperature in a smoking zone while smoking a meat product comprising measuring the temperature of the atmosphere in the smoking zone, measuring the internal temperature of the meat product being smoked, and continuously maintaining the smoking zone atmosphere at a temperature from about 25° F. to about 35° F. above the internal temperature of said meat product throughout the smoking process.

2. The method of controlling the temperature in a smoking zone while smoking a meat product comprising measuring the surface temperature of the meat product being smoked, measuring the internal temperature of the meat product being smoked, and continuously controlling the temperature of the atmosphere in the smoking zone to maintain the surface temperature of said meat product from about 25° F. to about 35° F. above the internal temperature of the meat product throughout the smoking process.

3. The method of controlling the temperature in a smoking zone while smoking a meat product comprising measuring the temperature of the atmosphere in the smoking zone, measuring the internal temperature of the meat product being smoked, and continuously maintaining the smoking zone atmosphere at a substantially constant temperature between about 25° F. to about 35° F. above the internal temperature of said meat product throughout the smoking process.

4. The method of controlling the temperature in a smoking zone while smoking a meat product comprising measuring the surface temperature of the meat product being smoked, measuring the internal temperature of the meat product being smoked, and continuously controlling the temperature of the atmosphere in the smoking zone to maintain the surface temperature of said meat at a substantially constant temperature between about 25° F. to about 35° F. above the internal temperature of the meat product throughout the smoking process.

References Cited in the file of this patent

UNITED STATES PATENTS

| | | |
|---|---|---|
| 1,643,582 | Martin | Sept. 27, 1927 |
| 1,775,682 | Martin | Sept. 16, 1930 |
| 2,140,163 | McKee | Dec. 13, 1938 |
| 2,394,061 | Horstkotte | Feb. 5, 1946 |
| 2,572,253 | Fellows et al. | Oct. 23, 1951 |
| 2,596,381 | Doty | May 13, 1952 |
| 2,635,137 | Basham | Apr. 14, 1953 |
| 2,973,277 | Barnett et al. | Feb. 28, 1961 |